3,189,538
COMBINATION OF HYDROGEN PRODUCING AND HYDROGEN CONSUMING UNITS
Jack B. Pohlenz, Arlington Heights, and Donald H. Belden, Prospect Heights, Ill., assignors to Universal Oil Products Company, Des Plaines, Ill., a corporation of Delaware
Filed Nov. 7, 1960, Ser. No. 67,532
3 Claims. (Cl. 208—58)

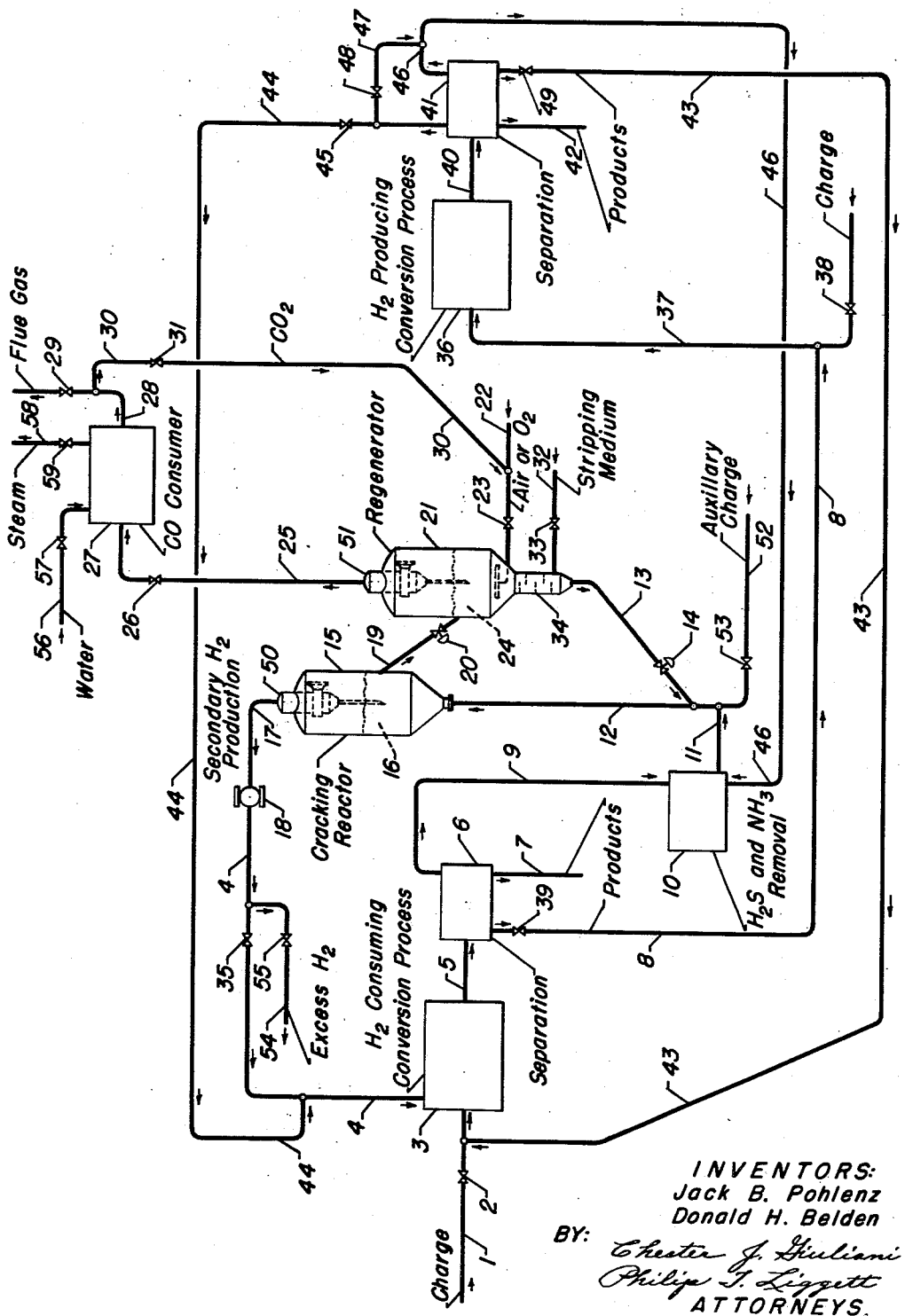

This invention relates to an improved combined system of hydrogen producing and hydrogen consuming processes wherein a fluidized high temperature cracking unit serves as means for purifying a hydrogen stream as well as a hydrogen supply zone.

Commercial production of hydrogen has generally made use of the water-gas reaction, where carbon and steam are reacted, or alternatively the shift reaction, where carbon monoxide and steam are reacted. However, in the present improved combined operation no water or steam is utilized in the hydrogen producing or purification sections. Instead hydrogen production is effected by conventional hydrocarbon conversion processing and by the high temperature fluidized contact of subdivided catalyst particles with a hydrocarbon containing stream to effect the formation of hydrogen and carbon. The hydrocarbon charge may be obtained from one or more hydrogen consuming and/or hydrogen producing hydrocarbon conversion units which are integrated with the fluidized unit. In the fluidized high temperature cracking operation, a hydrocarbon stream contacts heated sub-divided catalyst particles at a suitable controlled rate and temperature effecting the conversion of a major portion of the hydrocarbon charge to hydrogen and carbon, such that there is a resulting hydrogen rich stream substantially free of any carbon oxides. This type of hydrogen production is of particular advantage in that the resulting hydrogen stream is useable as such, without further treatment in other hydrocarbon conversion systems.

It is a principal object of the present invention to utilize a fluidized hydrogen producing unit in a system of hydrogen producing and hydrogen consuming conversion units as a source of hydrogen and/or as a hydrogen stream purifier.

Actually, the fluidized hydrogen producing unit of the system may serve as a "balancing unit" in the combination of hydrocarbon conversion units. For example, if in the combination of processing units there is a net deficiency of hydrogen in the processing units, such deficiency may be balanced by the direct introduction of natural gas, or other hydrocarbon stream, to the fluidized hydrogen producing unit to form hydrogen by the high temperature catalytic cracking operation. If, on the other hand, there is a surplus of hydrogen within the combination of processing units, the excess may be withdrawn at a point downstream from the fluidized hydrogen producing unit, providing thereby a net hydrogen stream which is generally 85%, or higher, in hydrogen content and of useable purity for most any chemical or hydrocarbon processing operation. The major component in the hydrogen rich stream comprises primarily unconverted methane, there being little if any contamination by carbon oxides. Thus, the fluidized hydrogen producing unit serves either as a hydrogen stream purifier, or a combination purifier-producer.

Another object of the present invention is to provide a fluidized hydrogen producer-purifier unit which makes use of a fluidized carbon burning zone which is operated to effect the production of a carbon monoxide rich effluent stream available for use as a reducing gas in a reducing unit, or which may be burned to carbon dioxide for the generation of heat which in turn may be used to produce high temperature steam useful in various refinery units. The carbon monoxide rich stream may, of course, be used directly in chemical operations, such as in the manufacture of formic acid or urea, or alternatively, the carbon monoxide may be used with steam in a gas-shift reactor to produce additional hydrogen.

In a broad aspect, the present invention provides a combination process for converting a hydrocarbon stream to produce hydrogen and more valuable hydrocarbon fractions in a manner comprising, passing a hydrocarbon charge stream to be converted to more valuable products together with a hydrogen containing stream, obtained as hereinafter set forth, at an elevated temperature and an elevated pressure to a confined catalyst containing hydrogen consuming reaction zone and effecting the conversion of the charge stream to provide an effluent stream containing the desired improved products, separating therefrom a light normally gaseous stream and passing it to a separate hydrogen supply zone wherein such stream contacts sub-divided heated catalyst particles at an elevated temperature and at a rate effecting the cracking of a major portion of the hydrocarbon content of such gaseous stream into hydrogen and carbon, and passing hydrogen from the hydrogen supply zone to the hydrogen consuming reaction zone to combine with the charge stream as aforesaid.

Various combinations of hydrogen consuming and hydrogen producing conversion units may be used within the scope of the present invention with one or more types of hydrocarbon conversion reactions being carried out in conversion units at conditions providing a net production of hydrogen. For example, various hydrocarbon dehydrogenation and reforming operations effect the net production of hydrogen and in such instances, one or more of such units may provide a primary source of hydrogen useable for recycle hydrogen as well as a hydrogen source for hydrogen consuming reaction units, while the fluidized high temperature cracking unit may serve as a secondary source of hydrogen or as a hydrogen-producer-purifier unit.

In a more specific embodiment, the present invention comprises a combination process for converting hydrocarbons to produce hydrogen and more valuable hydrocarbon fractions, in a manner which comprises, passing a hydrocarbon charge stream together with a stream which is principally hydrogen, obtained as hereinafter set forth, at an elevated temperature and at an elevated pressure to a confined catalyst containing hydrogen consuming reaction zone and effecting the conversion of such stream to provide an effluent stream containing the desired more valuable products, effecting the separation of a light normally gaseous stream from the product stream, separating in addition therefrom at least one hydrocarbon fraction suitable for further conversion in the presence of a catalyst to produce a desired improved hydrocarbon stream, passing such separated fraction to a hydrogen producing conversion zone and contacting the same with a catalyst therein at conditions providing a net production of hydrogen and the desired improved hydrocarbon stream, separating from the latter stream a hydrogen rich stream and a light normally gaseous stream, passing the hydrogen rich stream to the hydrogen consuming reaction zone as at least a portion of the hydrogen being introduced thereto together with the charge stream, passing the separated light gaseous streams from both the hydrogen consuming and hydrogen producing zones to a secondary hydrogen producing zone and into contact with sub-divided heated catalyst particles, effecting the fluidized contact of the latter at an elevated temperature and at a rate effecting the cracking of the light gaseous streams into hydrogen and carbon, passing at least a portion of the resulting hydrogen product stream from the secondary hydrogen producing reaction zone into admixture with the charge stream and the hydrogen from the hydrogen producing conversion zone, whereby to supply the balance of hydrogen being passed to the hydrogen consuming reaction zone as aforesaid.

In a preferred combined processing system, embodying hydrogen consuming and hydrogen producing units it is generally desirable to maintain a high purity to the hydrogen rich stream which is recycled and introduced to the hydrogen consuming units. Thus, it is advisable to continuously effect the removal of sulfur and nitrogen compounds which have been introduced into the system by the various charge streams. In a preferred operation of the present system, such contaminants are removed from the system by treating the gaseous and vaporous streams which are introduced into the fluidized high temperature cracking unit. Hydrogen sulfide may be removed, for example, by conventional means such as Girbotol unit, while ammonia may be removed by conventional means which may include acid washing or the passing of the mixture of gases through a cationic ion-exchange resin.

In the present description, the term "hydrogen consuming unit" is used in a generic aspect to refer to any hydrocarbon conversion process unit which utilizes hydrogen, normally in the presence of a catalyst, to aid in the enhancement of one or more hydrocarbon charge fractions, or to effect the conversion of one or more hydrocarbon fractions in a hydrogenating step, whereby to provide an improved more valuable product stream. For example, hydrogen may be passed in admixture with a hydrocarbon distillate stream into contact with a suitable refractory hydrocracking catalyst at high temperature from about 500 to about 850° F. and at high pressure conditions, above 1,000 pounds per square inch, to effect the selective cracking of the distillate stream into desired lower boiling fractions. A mixed hydrocarbon stream may be subject to hydrogenation to effect desulfurization and nitrogen compound removal and to provide a more saturated purified product stream useful as such as fuel or for charge to another conversion unit. Suitable hydrogenation catalysts may comprise sulfur resistant composites of a cobalt, nickel, molybdenum compound or mixtures thereof on alumina.

Another process consuming small quantities of hydrogen may comprise the isomerization of butane, pentane, and hexane fractions, or mixtures thereof, where such fractions are treated in the presence of an isomerization catalyst and hydrogen to provide high yields of desired isomerized fractions. The catalyst may comprise platinum containing solid particles, while operating conditions are generally relatively mild, with temperature in the range of from about 300° to 900° F. and pressure from 300 to 1000 pounds per square inch.

Another hydrogen consuming process comprises the hydrogenation of an aromatic stream, such as benzene to cyclohexane, with high conversions being obtained by passing the benzene stream together with hydrogen over a suitable hydrogenating catalyst at hydrogenating conditions, and as taught for example in U.S. Patent No. 2,755,317. Still another hydrogen consuming process comprises the hydrogenation-dealkylation of an aromatic fraction having a side chain to effect the removal of at least one side chain from such stream. For example, toluene may be subjected to a dealkylation step by passing toluene fraction together with hydrogen to a confined conversion zone maintaining a catalyst, such as chromia-alumina type catalyst, at a temperature above about 1200° F., as taught in U.S. Patent No. 2,951,886, whereby to produce high yields of benzene.

In a similar aspect the term "hydrogen producing" zone is used generically herein to encompass one or more hydrocarbon conversion zones which effect a net production of hydrogen in the conversion step. Such conversion step may comprise, for example, either high temperature thermal cracking, or catalytic cracking, where a high boiling charge stream is subject to cracking to effect the production of lower boiling more desirable fractions while at the same time effecting the cracking of a limited amount of the charge to gaseous fractions including a net production of hydrogen.

A dehydrogenation process also produces hydrogen, such as the dehydrogenation of normal propane, butane, pentane, and hexane fractions, or mixtures thereof, to effect high yields of olefinic hydrocarbons and a net production of hydrogen. The dehydrogenation may be carried out at high temperatures in the range of 900° to 1200° F. and at slight superatmospheric pressures.

Still another hydrogen producing conversion process is the catalytic reforming of a naphtha or gasoline boiling range stream to produce improved octane number gasoline. Catalytic reforming is now widely used commercially, being carried out in a manner such as taught by U.S. Patent No. 2,479,110. Hydrogen produced from such units has been used in other processing operations, although not in the same manner as carried out by the improved integrated process of the present system.

Still other processing operations will be apparent to those familiar with the petroleum processing arts and it is not intended to limit the present invention to the use of the particular hydrogen producing and hydrogen consuming operations which have been set forth hereinabove. However, the present invention may be better explained and described and the scope better understood by reference to the accompanying diagrammatic drawing and the following description thereof.

Referring now to the drawings, there is indicated a line 1, having valve 2, suitable for passing a hydrocarbon charge stream to a hydrogen consuming conversion process zone 3. Such zone is, of course, not shown in detail and may comprise one or more reactors, heaters, and accompanying apparatus whereby a particular conversion process may be effected, generally in the presence of a catalytic material. Hydrogen is admixed with the charge stream at the conversion zone 3 by means of line 4. As hereinbefore indicated, any one of several types of hydrocarbon conversion operations may be carried out, however, for purposes of illustration it will be presumed that a gas-oil stream is being subjected to hydrogenation in zone 3 to effect the removal of sulfur and nitrogen compounds, as well as metal contaminants, whereby an improved fuel oil stream is obtained. The product stream is passed by way of line 5 to a separation zone 6 where various separation and fractionation steps may be employed to obtain desired product fractions by way of lines 7 and 8 as well as gaseous fractions. Although not shown in the drawing, a gas stream comprising primarily hydrogen may be separated in a first separation step and used as recycle to the conversion step. A normally gaseous hydrocarbon and hydrogen containing stream may be separated and passed by way of line 9 to a sulfur and nitrogen compound removal zone 10. Such zone may comprise conventional stripping or absorption means suitable for removing hydrogen sulfide and ammonia from the gaseous stream.

The resulting treating stream from zone 10 is passed by way of line 11 to a riser line 12 and into admixture with heated catalyst particles being introduced into line 12 by way of line 13 and control valve 14. In accordance with a preferred embodiment of the invention, there is indicated a fluidized contact of the resulting gaseous stream and the heated sub-divided catalyst particles. There is a continuous introduction of the stream and entrained particles into an elevated reaction zone 15 maintaining a fluidized or agitated dense phase bed of catalyst 16. The catalyst particles are introduced into admixture with the hydrocarbon stream at the lower end of riser line 12 at a temperature of about 1200° F. to about 1600° F. to form a resulting cracked product stream comprising primarily hydrogen with little or no formation of carbon oxides. A small amount of unconverted methane comprises the principal contaminant in the hydrogen stream passing overhead from the reaction zone 15 by way of line 17 and compressor 18.

In the preferred embodiment using a fluidized operation, contacted carbonized catalyst particles from the fluidized bed 16 are continuously passed by line 19 and control valve 20 to a regenerator or carbon burning zone 21. In the latter, carbon is continuously removed from catalyst particles by burning in the presence of air or other oxygen containing stream being introduced by line 22 and valve 23 into the lower portion of regenerator 21. The oxygen content of the stream contacting the particles in the fluidized bed 24 is controlled to effect the burning of that amount of carbon that is continuously deposited on the particles and to effect a temperature sufficient to reheat the particles to in turn supply the endothermic heat of conversion in the reaction zone. Thus, the catalyst particles may be reheated to a temperature in the range of 1300° to 1800° F., whereby to effect the resulting high temperature cracking of the hydrocarbon stream to hydrogen and carbon. A controlled oxygen content and a controlled carbon level are also maintained in the regenerator 21 in order to provide the degree of carbon oxidation required to fulfill the thermal demands of the process.

Under most conditions the flue gas contains large percentages of carbon monoxide. A resulting carbon monoxide rich stream is discharged from the upper portion of the regenerator by way of line 25 and control valve 26 to a carbon monoxide consuming zone 27. The latter may comprise a carbon monoxide burner or boiler suitable for producing a quantity of high temperature steam, or alternatively, as hereinbefore set forth, the carbon monoxide may be utilized as a reducing stream for another processing operation, or provide a source of carbon monoxide in the production of urea, formic acid, and the like. The present drawing indicates a flue gas stream being discharged from the zone 27 by way of line 28 and valve 29 and water introduction through line 56 and valve 57, with steam discharged by way of line 58 and valve 59. An auxiliary line 30 with valve 31 is available for recycling a carbon dioxide rich stream to the air line 22 and providing thereby a control of oxygen content to the regenerator. The admixture of carbon dioxide further serves to enhance the equilibrium production of greater quantities of carbon monoxide during the regeneration or carbon burning step.

At the lower end of the regenerator zone 21 means is provided for stripping the heated sub-divided catalyst particles prior to their introduction to the cracking zone 15. Nitrogen or other inert gaseous medium is charged through line 32 and valve 33 to the stripping zone 34 so as to effect a concurrent contact of the catalyst particles as they descend from the lower portion of bed 24 to the outlet line 13. It has been found that the removal and stripping of carbon oxides and any metal contaminants which may become entrained with the particles from the burning zone, need to be removed prior to the introduction of the heated particles to the cracking zone so as to prevent any reducing operation taking place in the cracking zone and to in turn provide optimum yields of hydrogen with a minimum of carbon oxides as a contaminant to the hydrogen stream. The drawing indicates a cocurrent vapor stream and particle flow into and within the reactor 15, however, countercurrent flow of vapors and subdivided particles may well be carried out in the conversion zone within the scope of the present invention.

In the combined operation the hydrogen rich stream leaving the cracking reactor 15 is passed by way of compressor 18 and line 4 with valve 35 to the hydrogen consuming zone 3 whereby to provide at least a portion of the necessary hydrogen for such conversion zone. In the present combined system, it is also to be noted that the hydrogen producing reactor 15 may serve as a secondary source of hydrogen, the primary source being provided by a hydrogen producing zone 36 receiving a hydrocarbon charge stream by way of line 37 and valve 38. The charge through line 37 may comprise a hydrocarbon stream obtained from an outside source or it may comprise a product stream obtained from the separation zone 6 following the hydrogen consuming process step taking place in zone 3, such product stream being passed by way of line 8 and valve 39 to line 37. For example, zone 3 may be used for the hydrogen treating of a naphtha or gasoline boiling range stream which is to be subjected to catalytic reforming within the hydrogen producing zone 36. On the other hand, as hereinbefore indicated, one or more hydrocarbon fractions which are to be subjected to dehydrogenation, or a high boiling fraction which is to be subjected to cracking, may be introduced as charge through line 37 to zone 36. The latter zone may comprise one or more reactors and accompanying heaters, pumps, exchangers, etc., suitable to effect a desired conversion and discharge an effluent stream of improved more valuable hydrocarbon fractions. Such stream is indicated as passing by way of line 40 to separation zone 41 wherein there is effected the necessary separation and fractionation of the effluent stream to provide at least one or more product streams at lines 42 and 43. There is also separated in the present embodiment a hydrogen rich stream by way of line 44 having valve 45 and a normally gaseous fraction, which may contain some entrained hydrogen, being discharged by way of line 46.

Although not indicated in the drawing, a portion of the hydrogen stream from line 44 may be continuously recycled to the hydrogen producing zone 36 to provide a hydrogen environment for the conversion step, however, the net production of the hydrogen rich stream is passed by way of line 44 and valve 45 into admixture with hydrogen passing by way of line 4 and to the hydrogen consuming process zone 3. Depending upon the types of conversion being effected in the respective hydrogen producing zone 36 and hydrogen consuming zone 3, there may be either a large or small quantity of hydrogen produced for use in zone 3 and there may be varying hydrogen demands within the hydrogen consuming zone 3. In an alternative arrangement the net hydrogen production in line 44 may be passed by way of line 47 and valve 48 to line 46 which is provided to carry a light hydrocarbon stream to the treating zone 10 and to the hydrogen producing reactor 15. This arrangement serves to utilize the high temperature cracking zone 15 as a "hydrogen purifier." In other words, the hydrogen content of the stream is enhanced by the conversion of the light hydrocarbon components from line 46 to hydrogen and whereby a resulting stream may be obtained from the reactor 15 having a 85% hydrogen content or more. Sulfur and nitrogen compounds are removed in treating zone 10 prior to the stream being passed into contact with catalyst particles at the lower end of riser line 12. Such treating step precludes the building up of contaminating materials in the treating system.

In another alternative operation the combined system may make use of a product stream from the hydrogen producing zone 36 as a charge to the hydrogen consuming process zone 3. For example, an aromatic fraction, such as benzene or toluene, may be passed by way of line 43 and valve 49 to join with line 1 as the charge to the hydrogen consuming zone 3, whereby such aromatic fraction may be subject to hydrogenation to form a cycloparaffin, or alternatively, be subjected to dealkylation to remove a side chain therefrom.

As previously indicated, the present drawing is diagrammatic and does not show all pumps, valves, separating and fractionating equipment and the like which may be advisable or necessary in the design of a commercial unit. The hydrogen consuming and hydrogen producing conversion operations may be carried out in batch operations, but preferably are effected in a continuous manner by the use of suitable reaction zones which in turn make use of fixed or fluidized beds of catalyst. Where necessary, suitable regeneration provisions may be provided to effect continuous or periodic reactivation of catalyst beds which may be used in such units. In connection with the fluidized secondary hydrogen producing zone, particle separating means is shown diagrammatically at the upper ends of the contact chambers. A particle separator 50 being indicated at the top of reactor 15 is suitable for removing and returning entrained catalyst particles to the lower portion of the conversion zone and to catalyst bed 16, and particle separator 51 serves to return entrained catalyst particles to the bed 24 in the lower portion of regenerator 21.

In a combined operation having high hydrogen requirements, it may be necessary to provide an auxiliary charge of methane, or other hydrocarbon stream, to the fluidized hydrogen producing zone 15, such charge being introduced by way of line 52 and valve 53 to the lower end of riser line 12, whereby high temperature cracking will effect the production of an increased amount of hydrogen. On the other hand where the combined integrated system has a net production of hydrogen over and above that needed in the system, then excess hydrogen may be withdrawn from line 4 by way of line 54 and valve 55. Such hydrogen being, as hereinbefore noted, of substantial high hydrogen purity contaminated only with a small amount of methane and a very minor quantity of carbon oxides; where desirable, the small amount of carbon oxides may be in turn eliminated by passing the product stream to a methanation zone and effecting the conversion of carbon monoxide and carbon dioxide to methane by the following reactions:

$$CO + 3H_2 \rightarrow CH_4 + H_2O$$

and $$CO_2 + 4H_2 \rightarrow CH_4 + 2H_2O$$

To illustrate further utility of the present improved combined system the following examples set forth varying integrated combinations of conversion processes:

Example I

A gasoline boiling range material is charged to the hydrogen consuming zone 3 to effect the removal of sulfur, nitrogen and metal contaminants and to provide a suitable gasoline charge stream for a reforming operation in zone 36. Thus, the charge is contacted in zone 3 at a temperature in the range from about 500° to 800° F. and at a pressure in the range of from about 200 to 1500 pounds per square inch over a sulfur resistant catalyst and in the presence of hydrogen to effect saturation and desulfurization, etc., of the charge. Catalysts suitable for such hydrogenation operation are well known in the industry, usually comprising one or more oxides of cobalt, molybdenum and nickel, on a suitable supporting material. The effluent product stream is separated at zone 6 to provide a naphtha or gasoline boiling range stream for reforming that is in turn passed by way of lines 8 and 37 to the hydrogen producing process zone 36. Such stream is converted therein in the presence of hydrogen and in the presence of a suitable reforming catalyst at a temperature of 700° to 1000° F. and at a pressure of 200 to 1,000 pounds per square inch to produce an octane number gasoline stream. Likewise, the catalysts for reforming are well known in the industry and may comprise platinum, palladium, or other noble metal, on a suitable support such as alumina, together with an acid component, such as halogen or silica. One such catalyst being the Platforming catalyst now widely used in connection with the Platforming reforming process. The effluent stream from conversion zone 36 is subjected to separation and fractionation at zone 41 so as to provide a hydrogen rich stream, which may comprise 50%, or more, of hydrogen being discharged by way of line 44 to line 4 to in turn provide at least a portion of the hydrogen for the hydrogenation step in zone 3. A light normally gaseous hydrocarbon fraction is also separated at zone 41 and is discharged by way of line 46 to the secondary hydrogen producing zone. A resulting improved octane number gasoline is discharged by way of line 42 from separation zone 41. At the secondary hydrogen producing unit, the light gaseous fractions which may contain some entrained or absorbed hydrogen, enter riser line 12 from lines 9 and 46 and therein contact heated catalyst at a temperature of from 1200° to 1600° F. and at a rate effecting the formation of hydrogen and carbon at the cracking reactor 15. A resulting high hydrogen content stream from line 17 and compressor 18 is passed to line 4 to combine with hydrogen produced from zone 36 and passed by way of line 44. Where excess hydrogen is available, it is withdrawn from line 4 by way of line 54.

The removal of carbon and the reheating of the catalyst particles in the secondary hydrogen producing zone is carried out as hereinbefore described in connection with the drawing, catalyst particles passing by way of line 19 to regenerating zone 21 and reheated activated catalyst particles passed from stripper 34 to line 13 for recirculation to the cracking zone 15.

Example II

A naphtha stream is introduced by way of line 37 and valve 38 to hydrogen producing zone 36 and therein contacts a reforming catalyst at reforming conditions to provide an improved octane number product stream that is rich in aromatics. As described in connection with the drawing and Example I, a hydrogen rich stream is separated and discharged by way of line 46 to line 4 and the hydrogen consuming zone 3 while a light hydrocarbon gaseous fraction is separated and passed by way of line 46 to the treating zone 10 and to the cracking reactor 15 for the production of additional hydrogen. The liquid product stream discharged from line 40 may be separated in a manner to provide the removal of aromatic fractions, as, for example, by the use of a solvent extraction process that provides benzene, toluene, and xylene fractions. At least a portion of the benzene fraction is then withdrawn and passed by way of line 43 to provide charge to the hydrogen consuming process 3. In this zone the benzene fraction is subjected to hydrogenation in the presence of a suitable hydrogenation catalyst, such as a nickel compound composited on a siliceous support and in the presence of hydrogen being introduced by line 4, whereby the resulting hydrogenation provides a high yield of cyclohexane. The cyclohexane rich effluent stream is passed by way of line 5 to separation zone 6 where it is subjected to suitable separation and fractionation to provide a desired cyclohexane rich product stream at line 7, and at least a light gaseous fraction, which may contain some hydrogen. The latter is passed by way of line 9 to treating zone 10 and to the secondary hydrogen producing zone for further hydrogen production, or to effect "purification," whereby there is an enhancement of hydrogen content to the streams being introduced to reactor 15 by way of both lines 46 and 9. The resulting hydrogen rich stream from reactor 15 passes by way of line 17, compressor 18 and line 4 to combine with the hydrogen from line 44 and in turn provide hydrogen utilized in the hydrogen consuming zone 3.

Example III

In an alternative to the operation set forth in Example II, a toluene rich stream is withdrawn from separation zone 41 and passed by way of line 43 to the hydrogen consuming process zone 3. The toluene stream being therein subjected to contact with a suitable hydrodealkylation catalyst, such as, for example, chromia on alumina, at a temperature above about 1200° F.

The charge stream in zone 3 also contacts the catalyst in the presence of hydrogen from line 4 at a pressure of from 100 to 1000 pounds per square inch, effecting the removal of an alkyl radical to provide an effluent stream rich in benzene. The desired benzene stream may be withdrawn from separation zone 6 by way of line 7, while in a manner similar to the operations hereinbefore described, a lower boiling hydrocarbon fraction is separated and passed by way of line 9 to the treating zone 10 and cracking reactor 15 for the production of an improved high hydrogen content effluent stream at lines 17 and 4. Excess hydrogen may be withdrawn from the system through line 54.

*Example IV*

As set forth in Example II, a naphtha stream is introduced by way of line 37 to the hydrogen producing zone 36 wherein there is effected the reforming of such stream in the presence of a reforming catalyst at reforming conditions to provide an improved octane number gasoline stream. The product stream is separated in zone 41 to provide an overhead hydrogen rich stream and normally gaseous hydrocarbon stream in the manner also set forth in Example II, while further separation is effected to obtain normal $C_4$, $C_5$, and $C_6$ fractions. One or more of the fractions, or a mixture of such fractions, are passed by way of line 43 to the hydrogen consuming conversion zone 3 wherein there is effected the isomerization of the charge stream in the presence of an isomerizating catalyst. The isomerization catalyst in zone 3 may, for example, comprise a platinum compound or a solid support material such as alumina. The stream to be treated contacts the catalyst at a temperature of from about 300° to about 900° F. and at a pressure of from about 300 to about 1,000 pounds per square inch, in the presence of hydrogen introduced from line 4.

A resulting isomerized product stream may be withdrawn from separation zone 6 by way of line 7, while a separated normally gaseous hydrocarbon fraction is passed overhead by way of line 9 to the treating zone 10 and to the secondary hydrogen producing reactor 15 in accordance with the procedure described in the foregoing examples. In the present operation there is only a small consumption of hydrogen in the conversion zone 3 and as a result there is more hydrogen produced from the reforming separation zone 41 and from the high temperature cracking zone 15 than is necessary for use in the combined system. Thus, net hydrogen with a substantially high purity may be withdrawn from the combined system by way of line 54 and valve 55.

*Example V*

A hydrocarbon distillate stream, which may comprise a wide boiling range material with an I.B.P. of about 400° and a 900° F. E.P. is charged by way of line 1 to the hydrogen consuming unit 3. It is therein subjected to selective hydrocracking in the presence of hydrogen, introduced by way of line 4, and a hydrocracking catalyst contact at a temperature in the range of about 500° to about 850° F. and a superatmospheric pressure above about 1000 pounds per square inch. The catalyst may comprise a refractory support such as silica-alumina with an activating component comprising one or more oxides of the iron group of metals of Group VIII of the Periodic Table. In separation zone 6 the resulting hydrocracked effluent stream may be separated to provide lower boiling fractions including $C_3$, $C_4$, and $C_5$ components suitable for dehydrogenation in the hydrogen producing zone 36. A light gaseous overhead fraction is separated and passed by way of line 9 to treating zone 10 and then by way of lines 11 and 12 to the secondary hydrogen producing cracking reactor 15 whereby to effect the conversion of hydrocarbon fractions contained therein to hydrogen and carbon. Hydrogen so produced is passed by way of lines 17 and 4 to the hydrogen consuming zone 3 to thus supply the necessary hydrogen for the hydrocracking conversion step.

One or more of the $C_3$ to $C_5$ fractions is passed by way of lines 8 and 37 to the conversion zone 36 wherein such fractions are subject to dehydrogenation in the presence of a dehydrogenating catalyst maintained at dehydrogenating conditions. The dehydrogenating catalyst in zone 36 may comprise, for example, a chromia-alumina catalyst and the hydrocarbon stream is passed at a temperature of from about 1000° to 1200° F. and at a slight superatmospheric pressure into contact with such catalyst. Resulting unsaturated products are passed to the separation zone 41 and there-in subject to separation and fractionation to provide one or more product streams, as well as an overhead hydrogen stream passing by way of line 44 to line 4, and a normally gaseous hydrocarbon fraction passing by way of line 46 to treating zone 10 and to the high temperature cracking reactor 15. Again, where excess hydrogen is provided by the system, such excess may be withdrawn by way of line 54.

*Example VI*

A hydrocarbon distillate stream, which again may comprise a wide range boiling material, is treated in the hydrogen consuming zone 3 to effect the hydrocracking thereof in the manner set forth in the foregoing Example V. At the same time a gas-oil stream, which may or may not be obtained from the separation zone 6, is introduced to the hydrogen producing zone 36 wherein there is effected a catalytic cracking of such gas-oil fraction to produce a marketable gasoline boiling range material. The gas-oil cracking may be substantially conventional, contacting a silica-alumina catalyst at a temperature of from about 800° to about 1000° F. and at a suitable rate of contact to provide desired high yields of gasoline boiling range material. The contact may be effected at low superatmospheric pressure in a fixed bed or in a fluidized catalyst operation. Both types of operation are widely used in the industry and it is not intended to limit the present combined process to any one type of contacting operation in this step. Separation is effected to provide one or more liquid product streams from zone 41, as well as to separate a normally gaseous fraction which is passed overhead by way of line 46 to treating zone 10 and the high temperature cracking reactor 15, whereby hydrocarbon components in the stream may be converted to hydrogen and carbon in the manner heretofore set forth in the previous examples. A resulting hydrogen rich stream is passed by way of lines 17 and 4 to the hydrocracking conversion operation in zone 3. In connection with a cracking operation as set forth in this example, it is generally preferable to separate a single light gaseous hydrocarbon fraction to pass by way of line 46 to the secondary hydrogen producing zone.

*Example VII*

A light or reduced crude charge is passed by way of line 37 to the conversion zone 36 and there-in subjected to thermal cracking at an elevated temperature of from about 800° to about 1100° F. and a superatmospheric pressure above about 200 pounds per square inch. The resulting cracked fraction is separated in zone 41 to provide desired lower boiling liquid products as well as an overhead gaseous fraction passed by way of line 46 to treating zone 10 and the high temperature cracking reactor 15, whereby to effect the production of a hydrogen rich stream. A gasoline or naphtha fraction is obtained from separation zone 41 and is passed by way of line 43 to the hydrogen consuming zone 3 and is therein subjected to hydrogenation by contacting a suitable hydrogenating catalyst at hydrogenating conditions, such as set forth in Example I. There is thus provided a resulting purified and desulfurized naphtha product stream suitable for use as such, or as charge to a catalytic reforming unit to produce a high octane gasoline. An overhead gaseous fraction is discharged from separation zone 6 by way of line 9 and passed to the treating zone 10 and the hydrogen producing zone 15 whereby resulting hydrogen is provided for use in the hydrogenation zone 3 by way of line 4. In this particular combined process a hydrogen rich stream may be separated following the cracking carried out in zone 36, however, a preferred operation will generally separate a single gaseous fraction from zone 41 to pass by way of line 46 into admixture with the gaseous fraction from line 9, whereby a single high hydrogen content stream is produced from cracking reactor 15 for use in the hydrogenation step being carried out in zone 3.

Still other hydrogen consuming and hydrogen producing operations and combinations in the present improved system will be apparent to those familiar with the petroleum processing arts.

We claim as our invention:

1. A conversion process which comprises
   (1) subjecting hydrocarbon oil in admixture with hydrogen to a hydrogen-consuming reaction in a first conversion zone,
   (2) separating from the resultant products a normally gaseous hydrocarbon fraction and a normally liquid hydrocarbon fraction,
   (3) cracking said normally gaseous fraction to hydrogen and carbon in a second conversion zone in contact with heated subdivided catalyst particles,
   (4) subjecting said normally liquid fraction to a hydrogen-producing conversion reaction in a third conversion zone,
   (5) separating a hydrogen-containing gas from the effluent of said third zone, and
   (6) introducing at least a portion of said gas to said second zone and passing hydrogen from the latter to said first zone to supply hydrogen for the hydrogen-consuming reaction therein.

2. The process of claim 1 further characterized in that a saturation and desulfurization of a gasoline fraction is effected in said first zone and in that a reforming of thus treated gasoline hydrocarbons is effected in said third zone.

3. A conversion process which comprises
   (1) subjecting hydrocarbon oil in admixture with hydrogen to a hydrogen-consuming reaction in a first conversion zone,
   (2) separating from the resultant products a normally gaseous hydrocarbon fraction and a normally liquid hydrocarbon fraction,
   (3) subjecting said normally liquid fraction to a hydrogen-producing conversion reaction in a third conversion zone,
   (4) separating from the effluent of said third zone a vaporous stream containing hydrogen and light hydrocarbons,
   (5) contacting said vaporous stream and said normally gaseous hydrocarbon fraction with subdivided heated catalyst particles at a temperature sufficient to crack the major portion of the hydrocarbons contained therein to hydrogen and carbon, and
   (6) introducing hydrogen thus formed to said first zone to supply at least a portion of the hydrogen for the hydrogen-consuming reaction therein.

References Cited by the Examiner

UNITED STATES PATENTS

| | | | |
|---|---|---|---|
| 2,717,860 | 9/55 | Rex | 208—136 |
| 2,758,064 | 8/56 | Haensel | 208—60 |
| 2,885,267 | 5/59 | Buchmann et al. | 23—209.4 |
| 2,895,896 | 7/59 | Ploeg | 208—58 |
| 2,913,401 | 11/59 | Weikart et al. | 208—164 |
| 2,934,573 | 4/60 | Paulsen et al. | 260—667 |
| 2,982,622 | 5/61 | Jahnig et al. | 23—209.4 |
| 3,008,895 | 11/61 | Hansford et al. | 208—112 |
| 3,057,689 | 10/62 | McEvoy et al. | 252—411 |

ALPHONSO D. SULLIVAN, Primary Examiner.